Nov. 20, 1951     P. F. PRICE     2,575,638
CUCUMBER HARVESTER
Filed Nov. 19, 1948
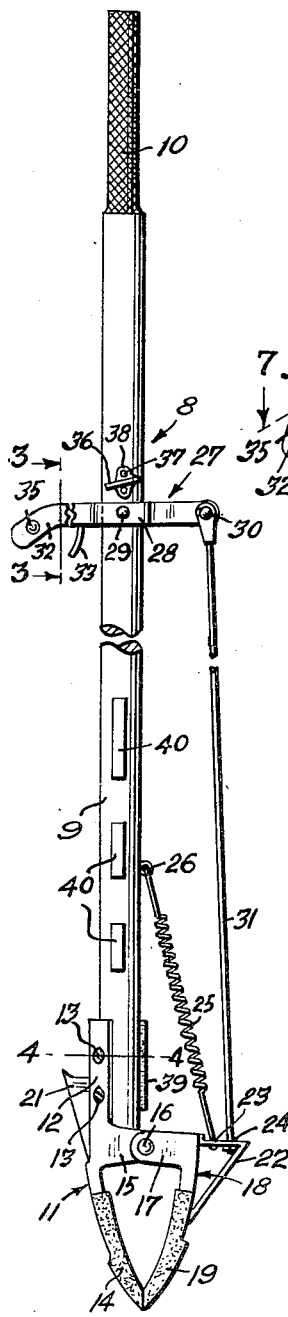
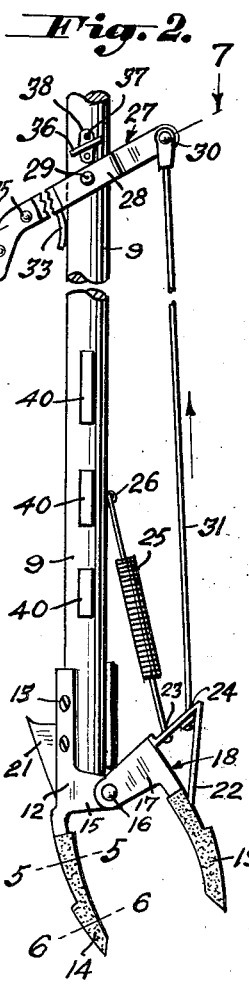
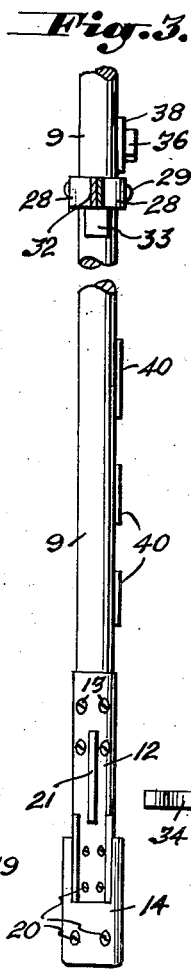
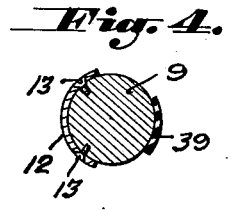
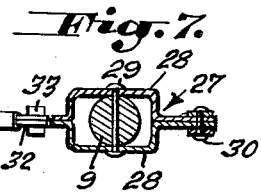
Inventor
Peter F. Price
By John N. Randolph
Attorney Patented Nov. 20, 1951

2,575,638

UNITED STATES PATENT OFFICE 2,575,638

CUCUMBER HARVESTER

Peter F. Price, Kalamazoo, Mich.

Application November 19, 1948, Serial No. 60,913

2 Claims. (Cl. 294—50.8)

1

This invention relates to a novel implement for use in harvesting cucumbers and by the use of which the operator may disengage cucumbers from a vine and deposit them in a receptacle while standing in an upright position thereby reducing to a minimum the manual labor required and enabling an operator over a period of time to harvest a greater number of cucumbers than if the operation is performed manually, without the implement and so that the operator would be required to assume a stooping position.

Another object of the invention is to provide a harvesting implement which can be utilized for moving a basket, pail or other receptacle, into which the cucumbers are placed, along as the operator advances down a row of cucumber vines.

A further and important object of the invention is to provide an implement having jaws for grasping the cucumbers and which are normally urged to an open position so that the manually operated element of the implement can be actuated for moving the jaws toward a closed position and into gripping engagement with a cucumber after which said manually actuated part may be utilized for twisting the implement substantially on its longitudinal axis for disengaging the cucumber from the vine.

Various other objects and advantages of the invention will hereinafter become more fully apparent from the following description of the drawing, illustrating a preferred embodiment thereof, and wherein:

Figure 1 is a side elevational view of the implement showing the jaws thereof in a closed position;

Figure 2 is a fragmentary side elevational view showing the jaws in their normal, open position;

Figure 3 is an elevational view of the lower portion of the implement looking from left to right of Figure 2;

Figure 4 is a cross sectional view taken substantially along a plane as indicated by the line 4—4 of Figure 1, and Figures 5, 6 and 7 are transverse sectional views taken substantially along planes as indicated by the lines 5—5, 6—6 and 7—7, respectively, of Figure 2.

Referring more specifically to the drawing, the cucumber harvesting implement in its entirety is designated generally 8 and includes an elongated handle 9 which is preferably of substantially circular cross section and which may be formed of any suitable relatively light weight material which is strong and durable. The upper portion of the handle 9 is preferably of restricted diameter and roughened or knurled to provide a hand grip 10.

A stationary jaw, designated generally 11, is provided with a shank portion 12 of arcuate cross section which is disposed against a portion of the other, lower end of the handle 9 and longitudinally thereof and which is fixedly secured thereto in any suitable manner as by means of screw fastenings 13. The opposite end of the jaw 11 which extends below the handle 9 is curved inwardly or across the axis of said handle and said jaw 11 which is relatively wide and substantially flat in cross section adjacent its terminal, as seen in Figure 6, is enclosed in a casing 14 of rubber or similar material 14. An extension of the casing 14 covers the upper part of the inner side of the jaw 11 and engages over the flanged side edges thereof, as seen in Figure 5. The casing 14 is secured to the jaw 11 by a plurality of suitable fastenings 20, such as rivets. The shank portion 12 adjacent or beyond the lower end of the handle 9 is provided with a pair of integral ears 15 which project transversely from the side edges thereof across the handle 9 and which are pivotally connected by a pin 16, having headed ends, to a similar pair of inwardly extending ears 17 which are formed integral with and project inwardly from the upper end of a second, movable jaw 18. The jaw 18 is similar in shape to the jaw 11 and extends downwardly from the ears 17 and is curved inwardly and toward the free end of the jaw 11 and is likewise incased in a casing 19 of rubber or similar soft, resilient material. As clearly illustrated in Figures 1 and 2, the incased terminals of the jaws 11 and 18 are beveled for abutting engagement when the jaws are in a closed position as illustrated in Figure 1 and when thus disposed, said jaws combine to form a substantially V-shaped recess. The casing 19, like the casing 14, completely encloses the lower end of the jaw 18 and the inner side and side edges of the upper portion thereof and is similarly fastened by rivets or other fastenings 20.

The shank 12 is provided on its outer side with a longitudinally extending web 21 the upper end of which forms an upwardly opening hook, for a purpose which will hereinafter become apparent. The upper portion of the movable jaw 18 is provided with an integral outwardly projecting web 22 having spaced openings 23 and 24 therein, located adjacent the upper edge thereof. One end of a contractile coil spring 25 is connected to the opening 23 and said spring extends upwardly and inwardly from the web 22 and is anchored at its opposite end to the handle 9 by an eye screw or other fastening 26. The spring 25 exerts an upward pull on the web 22 for normally causing the jaw 18 to swing on the pivot 16 in a counter-clockwise direction and toward an open position.

An actuating lever 27 is swingably mounted on the handle 9 intermediate of the ends of said handle. The lever 27 is preferably formed of two strips of metal the end portions of which are suitably secured together and which are provided with laterally offset intermediate portions 28 which straddle the handle 9 and through which extend a pivot pin 29 which likewise extends diametrically through the handle 9 for swingably supporting the lever 27 thereon. One end of the lever 27 is pivotally connected as seen at 30 to one end of a relatively heavy gauge wire or rod 31 which extends downwardly from the lever 27 and the opposite end of which pivotally engages in the opening 24. The opposite end of the lever 27 forms a handle 32 which is provided at its inner end with a depending finger rest 33. The handle 32 is provided with a fiber grip portion 34 secured thereto by rivets 35. A thumb rest 36 is secured to the handle 9 above the pivot 29 by fastenings 37 which extend through a flange 38 which is formed on the inner end of the thumb rest 36 and bears against said handle 9. A strip 39 preferably formed of rubber, but which may be formed of metal, is secured in any suitable manner to the handle 9 adjacent its lower end and on the opposite side thereof to the shank portion 12 to provide a stop for the movable jaw 18. The handle 9 is provided adjacent its lower end with longitudinally spaced strips 40 which may be utilized for measuring and grading the cucumbers.

The handle 9 is of sufficient length so that a man standing in an upright position may grasp the grip 10 with either hand and with the other hand employed for grasping the handle 32 and with the implement thus held and without stooping, the jaws 11 and 18 will be disposed at a level for engaging cucumbers growing on a vine. The thumb of the hand engaging the handle 32 is positioned to rest on the thumb rest 36 and with the jaws in their normal open position, as seen in Figure 2, said jaws are positioned around a cucumber, not shown. The handle 32 is then swung upwardly for moving the jaws toward a closed position for gripping the cucumber after which the handle 9 is twisted on its longitudinal axis by exerting a lateral force on the handle 32 for disengaging the cucumber from the vine. The jaws 11 and 18 are then positioned over a receptacle, not shown, and the lever handle 32 is then released to permit the jaws to resume their open position of Figure 2 so that the cucumber will drop into the receptacle, after which the operation previously described is repeated. The jaws will be automatically returned to their open position by the spring 25. The wire or rod 31 is sufficiently rigid to return the jaw 18 to a closed position and to hold the jaw in sufficiently tight gripping engagement with a cucumber to disengage it from a vine, but said wire or rod 31 possesses enough resiliency to spring outwardly if an excess pressure is exerted thereon by the lever 27 so that a cucumber will not be bruised by the jaws. As the worker progresses along a row of vines the receptacle for the harvested cucumbers can be moved along the crop row by the implement 8 by utilizing the hook 21 for engaging the handle or bale of said receptacle. The casings 14 and 19 will prevent injury to the cucumbers when gripped sufficiently in the jaws to permit them to be disengaged from the vine. Thus, it will be readily apparent that the implement 8 can be utilized by a worker for harvesting cucumbers or other items growing on vines close to the ground and without the necessity of stooping or bending thereby enabling a worker to accomplish a harvesting opertion with much less manual effort and accordingly with greater speed over a period of time.

Various modifications and changes are contemplated and may obviously be resorted to, without departing from the spirit or scope of the invention as hereinafter defined by the appended claims.

I claim as my invention:

1. A harvesting implement for vine grown crops comprising an elongated handle, a stationary jaw fixed to and projecting from the lower end thereof, a movable jaw swingably connected to the stationary jaw, spring means for normally biasing the movable jaw to an open position, manually actuated means for swinging the movable jaw to a closed position, said manually actuated means comprising a lever swingably connected to the handle intermediate of the ends of the latter, a link member pivotally connected to one end of said lever and to said movable jaw, the opposite end of said lever forming a handle portion for rocking the lever in one direction for moving the movable jaw to a closed position, said link member being sufficiently rigid to swing the movable jaw to a closed position and to hold the jaws in sufficiently tight gripping engagement for disengaging a cucumber from a vine yet being sufficiently resilient to yield outwardly in response to an excess force exerted thereon by the lever to prevent the jaws from engaging the cucumber with sufficient force to bruise the surface thereof.

2. A harvesting implement for vine grown crops comprising an elongated handle, a stationary jaw fixed to and projecting from the lower end of the handle, a movable jaw swingably connected to the stationary jaw, spring means normally biasing the movable jaw away from the stationary jaw and to an open position, and manually actuated means for swinging the movable jaw to a closed position including a link having one end pivotally connected to the movable jaw and extending therefrom toward the upper end of the handle, said link being displaceable toward the movable jaw for displacing the movable jaw toward a closed position and being sufficiently rigid to maintain the movable jaw in a closed position in sufficiently tight gripping engagement with the stationary jaw for disengaging a cucumber from a vine yet being sufficiently resilient to yield outwardly in response to an excess force exerted thereon toward the movable jaw to prevent the jaws from engaging the cucumber with sufficient force to bruise the surface thereof.

PETER F. PRICE.

REFERENCES CITED

The following references are of record in the file of this patent:

UNITED STATES PATENTS

| Number | Name | Date |
|---|---|---|
| 492,721 | Garnett | Feb. 28, 1893 |
| 1,472,832 | Hennings | Nov. 6, 1923 |
| 1,826,365 | Rosen | Oct. 6, 1931 |
| 1,989,932 | Junkin | Feb. 5, 1935 |

FOREIGN PATENTS

| Number | Country | Date |
|---|---|---|
| 19,325 of 1904 | Great Britain | July 13, 1905 |